J. F. Babcock,

Rubber Car Spring.

No. 101,080.    Patented Mar. 22, 1870.

Witnesses,    Inventor,
            Jas. F. Babcock

United States Patent Office.

JAMES F. BABCOCK, OF BOSTON, MASSACHUSETTS.

Letters Patent No. 101,080, dated March 22, 1870.

IMPROVEMENT IN SPRINGS FOR RAILROAD CARS.

The Schedule referred to in these Letters Patent and making part of the same.

*To all whom it may concern:*

Be it known that I, JAMES F. BABCOCK, of Boston, in the county of Suffolk and State of Massachusetts, have invented an Improvement in Springs for Railroad Cars and other Vehicles, of which the following is a full, clear, and exact description, reference being had to the accompanying drawings making a part of this specification, in which—

Figure 1:
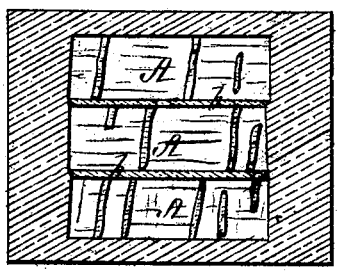
Figure 2:
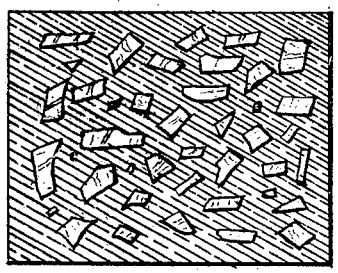

Figures 1 and 2 are vertical sections through springs constructed in accordance with my invention.

The object of my invention is to furnish a spring similar to the rubber springs now in use for cars and heavy vehicles, at a much less cost; and My invention consists in substituting cork, chemically prepared, for a portion of the rubber used for such purposes.

To enable others skilled in the art to understand and use my invention, I will proceed to describe the manner in which I have carried it out.

Cork is saturated with glycerine and heated to a temperature of 250° to 300° Fahrenheit. After this treatment the cork is pressed to remove the excess of glycerine.

Thin disks A, fig. 1, of this prepared cork, from one-fourth to one-half of an inch in thickness, are then placed alternately with thin disks $b$ of rubber, and the whole covered with rubber mixed with the proportion of sulphur for vulcanizing, to produce the ordinary elastic rubber as prepared for car-springs, &c.

The whole is then put into the mold, pressed, and then vulcanized in the usual manner. The cork, by this treatment, becomes highly elastic, while the rubber binds it together, forming a compact and substantial spring of great and permanent elasticity.

Cork in fine cuttings, as seen in fig. 2, may be treated with glycerine and mixed with the rubber and sulphur, and the whole vulcanized.

Other forms and arrangements of cork may be used if desired.

Claim.

What I claim as my invention, and desire to secure by Letters Patent, is—

The combination of cork, when chemically treated with glycerine, or its equivalent, with rubber, for the purpose specified.

Witness my hand this 5th day of February, A. D. 1870.

JAS. F. BABCOCK.

Witnesses:
   JAS. B. ROBB,
   H. D. MOIR.